US008074347B2

United States Patent
Anderson et al.

(10) Patent No.: US 8,074,347 B2
(45) Date of Patent: Dec. 13, 2011

(54) CABLING CONTINUOUS DEPLOYMENT SYSTEM AND TOOL

(76) Inventors: Bruce Anderson, Arlington, VA (US); Gregory Lindholm, Arlington, VA (US)

( * ) Notice: Subject to any disclaimer, the term of this patent is extended or adjusted under 35 U.S.C. 154(b) by 859 days.

(21) Appl. No.: 11/665,996

(22) PCT Filed: Jun. 8, 2005

(86) PCT No.: PCT/US2005/020122
§ 371 (c)(1),
(2), (4) Date: May 5, 2008

(87) PCT Pub. No.: WO2006/046975
PCT Pub. Date: May 4, 2006

(65) Prior Publication Data
US 2008/0210330 A1    Sep. 4, 2008

Related U.S. Application Data

(60) Provisional application No. 60/620,664, filed on Oct. 22, 2004.

(51) Int. Cl.
*B23P 19/00* (2006.01)
*H01R 43/00* (2006.01)

(52) U.S. Cl. .............. 29/755; 29/721; 29/748; 140/147; 242/129.5; 242/157 R; 242/397; 242/566

(58) Field of Classification Search .................... 29/755, 29/564.1, 721, 742, 748, 749, 753, 861; 140/93 R, 140/147; 242/129.5, 157 R, 397, 557, 566, 242/615.3
See application file for complete search history.

(56) References Cited

U.S. PATENT DOCUMENTS

| | | | |
|---|---|---|---|
| 2,155,769 A | 4/1939 | Porter | |
| 2,705,114 A | 3/1955 | Worsham | |
| 2,749,670 A | 6/1956 | Lewis | |
| 4,391,422 A | 7/1983 | McDonald | |
| 4,530,472 A | 7/1985 | Voss et al. | |
| 4,537,106 A * | 8/1985 | Rider | 83/650 |
| 4,564,152 A | 1/1986 | Herriage | |
| 4,611,645 A | 9/1986 | Whisnant | |
| 5,308,012 A | 5/1994 | Fuller | |
| 5,464,193 A | 11/1995 | Wrate | |
| 5,509,671 A | 4/1996 | Campbell | |
| 5,779,229 A | 7/1998 | Lirette | |
| 6,003,842 A | 12/1999 | Hug | |
| 6,130,975 A | 10/2000 | Eyres | |
| 6,267,355 B1 | 7/2001 | Fletcher | |
| 6,416,010 B2 | 7/2002 | Fletcher | |
| 6,940,018 B1 | 9/2005 | Dewhirst | |

* cited by examiner

*Primary Examiner* — Thiem Phan
(74) *Attorney, Agent, or Firm* — Young & Thompson

(57) ABSTRACT

A structured cabling tool includes an outer frame base supporting axle mounts that in turn support cable axles, the outer frame being extended in a ready for use condition and compacted in a ready for transport condition; inner frame arms supported within the outer frame base, the inner frame arms fixable upright orthogonal to the extended outer frame base in the ready for use condition and coextensive with the compacted outer frame in the ready for transport condition; a cable sorting threader supported between the inner frame arms; and a revolvable tape segmenting spindle supported by the inner frame arms below the cable sorting threader.

19 Claims, 6 Drawing Sheets

CABLING CONTINUOUS DEPLOYMENT SYSTEM AND TOOL

RELATED APPLICATIONS

This application claims priority to U.S. Provisional Application 60/620,664 filed on Oct. 22, 2004, the disclosure of which is wholly incorporated herein.

BACKGROUND OF THE INVENTION

The present invention concerns a system for the continuous deployment of cabling and a tool associated therewith that removes, or at least reduces, cable reel memory (reel set) in deployed structured cable and with efficiencies to save labor hours, material costs, and reduce errors as compared to prior art tools. The tool is advantageously used with structured cable but is not so limited and may be used with electrical cable and other cable such a security cable.

SUMMARY OF THE INVENTION

A first aspect of the present invention concerns a structured cabling system and tool that assists craftsmen with the continuous deployment of structured cabling over long distances to multiple locations so as to enhance the effectiveness of the craftsman in dealing with a large number of cables, while concurrently removing (or reducing) cable reel memory of cable coming off reels or out of cable boxes. Removing cable reel memory advantageously allows the pulled cable to lay flatter in an overhead horizontal run and reduces the length of cable necessary in making a lengthy cable run, making the cable pulling easier and increasing the effective length of the pulled cable.

Another aspect of the present invention concerns a cabling system and tool having a construction providing for craftsmen to systematically organize, measure, identify, and install multiple cables to multiple locations through the co-ordination and identification of numerous, varied cabling types using a tape system that assists in identifying individual cables being used. The labeling and organizing of cables right off the cabling tool avoids errors and improves efficiency.

Yet another aspect of the present invention concerns a cabling system and tool constructed for ease of transportation and assemble at a final job site.

A further aspect of the present invention concerns a cabling system and tool that handles all major types and sizes of structured cabling packaging including multiple size reels and boxes. Improved mounting of the cable reels reduces effort required to pull the cable bundles.

A still further aspect of the invention is system and tool scalable by providing a design allowing cabling tools of various sizes to afford portable tool solutions scaled to the task at hand. The scalable aspect allows for both a smaller hand-carried unit suitable for a "change and reconfigure" job and other small installations, and a larger model suitable for major installation jobs, where both can compact (e.g., folded) into a compact unit suitable for easy transport.

Particular structures that achieve these aspects of the invention are disclosed below. These above noted aspects of the invention are examples and not intended to be limiting, as one of skill will appreciate other advantages of the invention from the following disclosure and the drawing figures.

DESCRIPTION OF THE PREFERRED EMBODIMENTS

Figure 1:
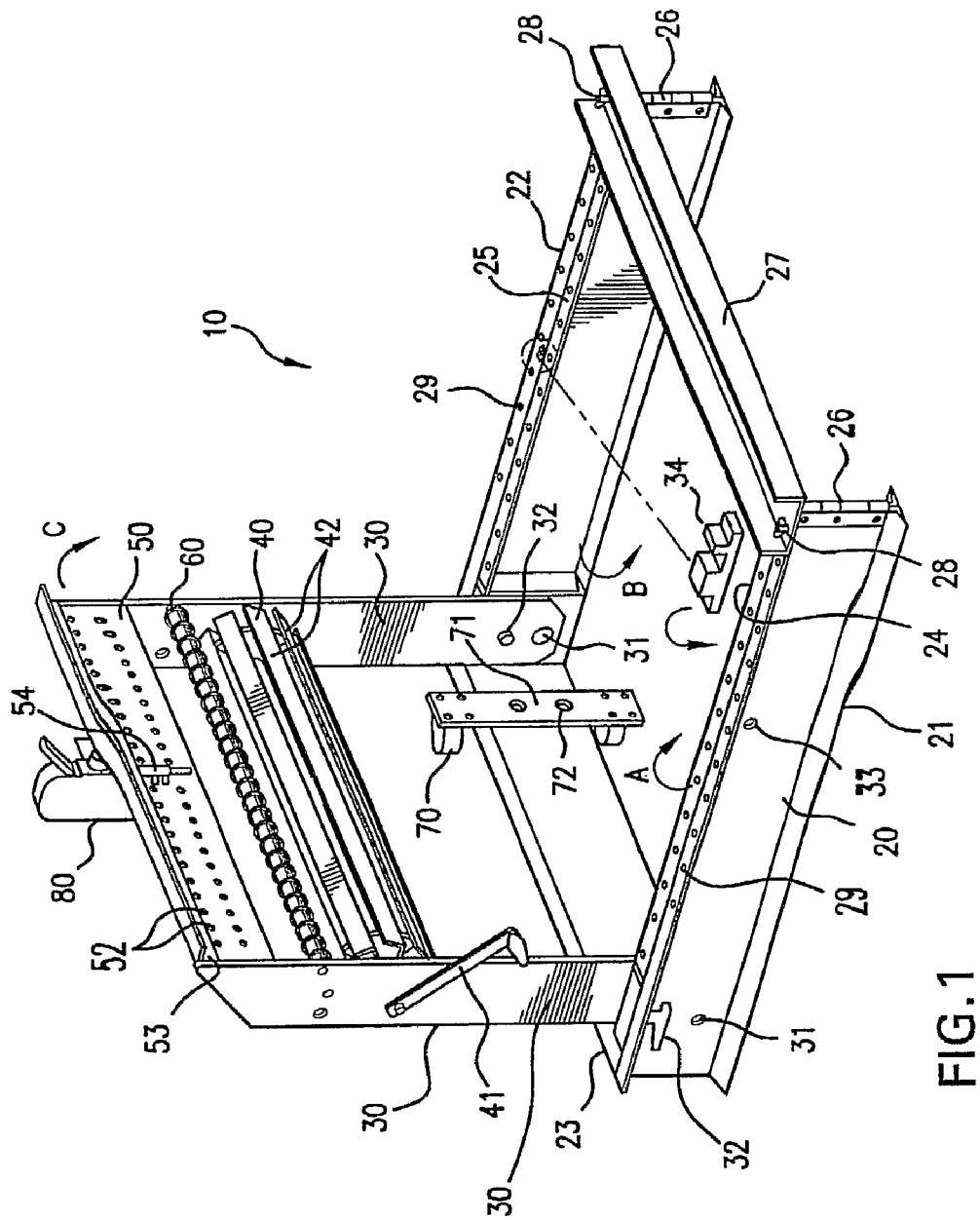
FIG. 1 illustrates an embodiment of the inventive structured cabling tool in a partially assembled condition and near ready use.

The following disclosure applies to the drawing figures generally. Specific references to any individual drawing figure is intended to clarify the related disclosure and is not intended to be limiting.

Figure 2:
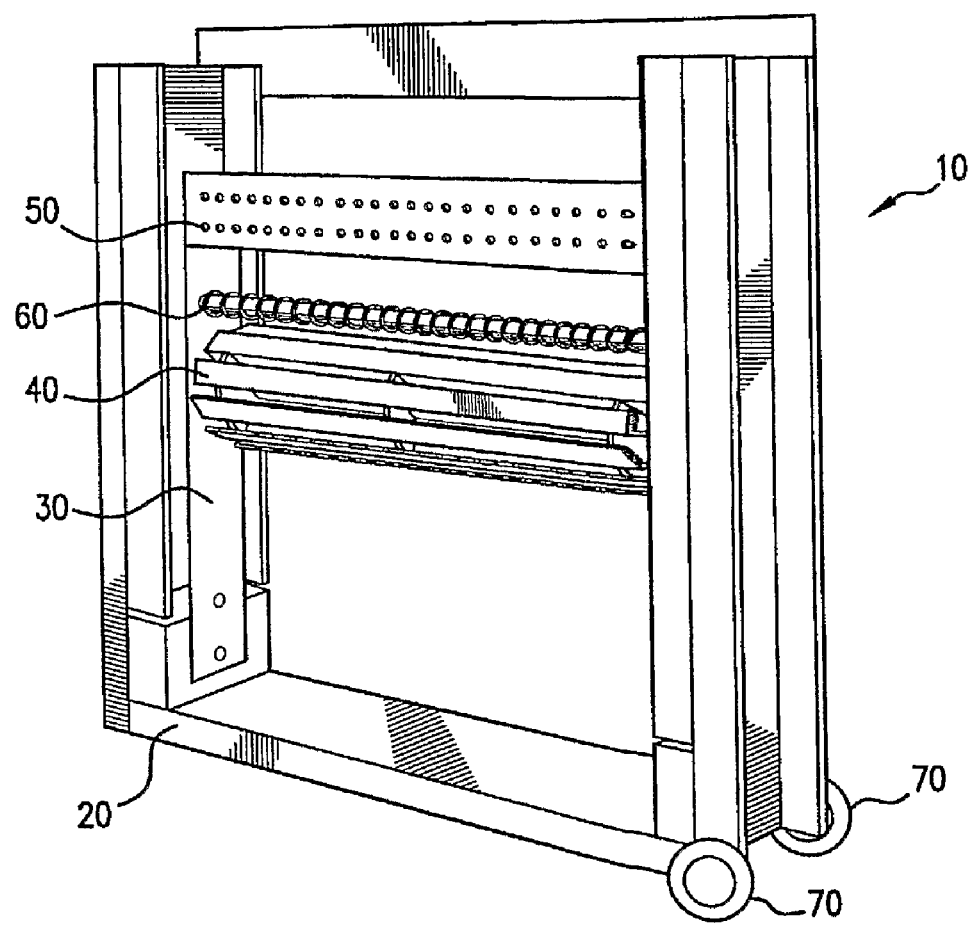
FIG. 2 illustrates an embodiment of the inventive structured cabling tool in a ready to transport condition.
Figure 3:
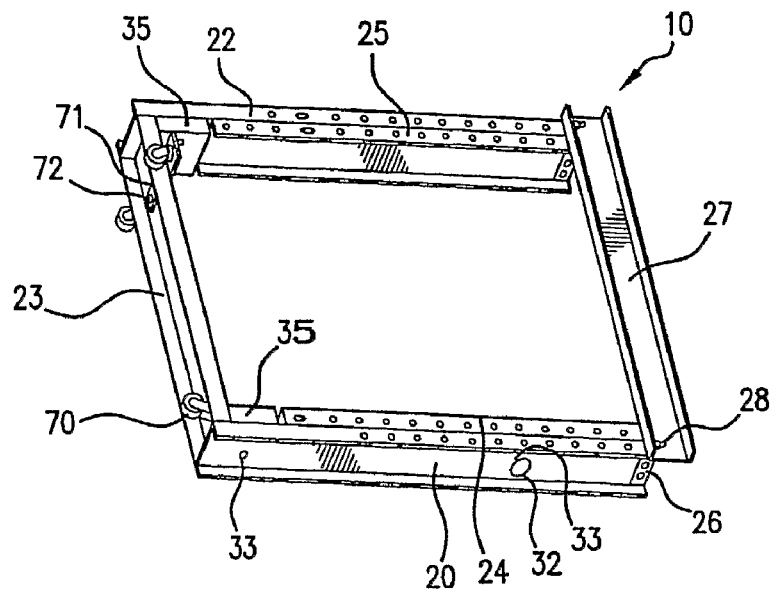
FIG. 3 illustrates another embodiment of the tool frame in the ready to transport condition.
Figure 9:
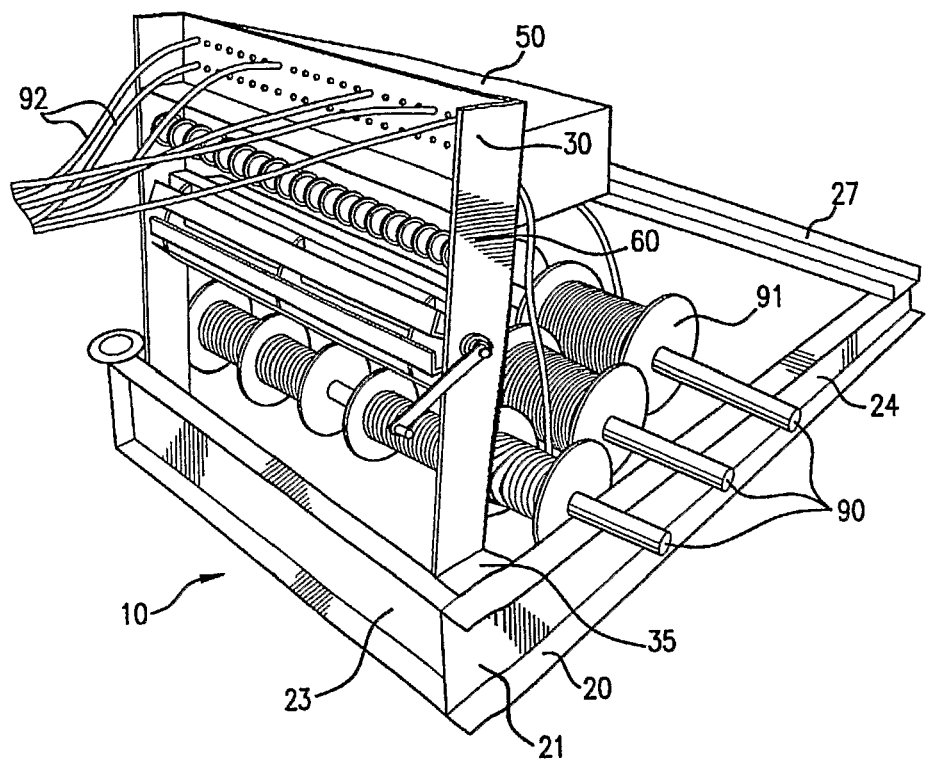
FIG. 9 illustrates the tool in the in ready for use condition with plural cable axles being supported.

The tool 10 is reconfigurable between two primary conditions: i) ready for use (use condition) and ii) ready for transport (transport condition). In the ready for transport condition the tool is compacted to fit through a building doorway. FIG. 1 illustrates a near ready for use condition, FIGS. 2-3 illustrate a ready to transport condition, and FIG. 9 illustrates a ready for use condition. The ready for use condition may also serve as a limited space use condition. Thus, the below discussed conditions are not limiting as the flexible use of the invention will be clear to those of skill in the art.

The tool 10 comprises an overall outer frame 20 which serves as a tool base when the tool 10 is in the ready for use condition. The outer frame 20 supports a pair of pivotable inner frame arms 30 (although pivoting in not essential). See FIG. 9 showing the tool 10 with the outer frame 20 flat on a floor surface.

A pair of pivots 31 is attached to the outer frame 20. The pair of pivotable inner frame arms 30 is shown in FIG. 1 being pivotedly mounted within the outer frame 20 at the pair of pivots 31.

The pair of inner frame arms 30 is shown in FIG. 1 being upright, e.g., orthogonal, to the outer frame 20. The pair of inner frame arms 30 is shown in FIG. 2 being side-by-side coextensive with the outer frame 20 in the ready for transport condition.

The pair of inner frame arms 30 support a cable sorting threader 50 between the individual inner frame arms 30 (also referred to as a cable sorting threader workstation 50). The cable sorting threader 50 may be L-shaped in cross section with a vertical section joined to a horizontal section. See FIGS. 1, and 4-5. The L shape provides extra rigidity at the top of the inner frame arms 30 as well as providing a supporting/guiding surface for cable meter 80.

The cable sorting threader 50 also includes a fin retaining plate 53 and a retaining element 54 to press the plate 53 against the vertical section, e.g., a clamp.

Figure 6:
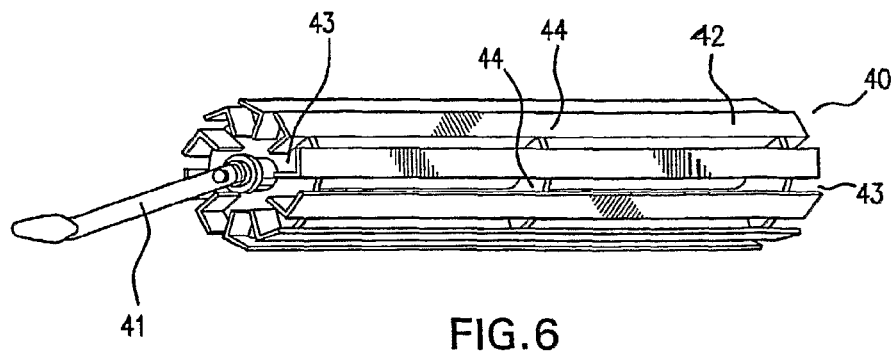
FIG. 6 illustrates a revolvable tape segmenting spindle.
Figure 8:
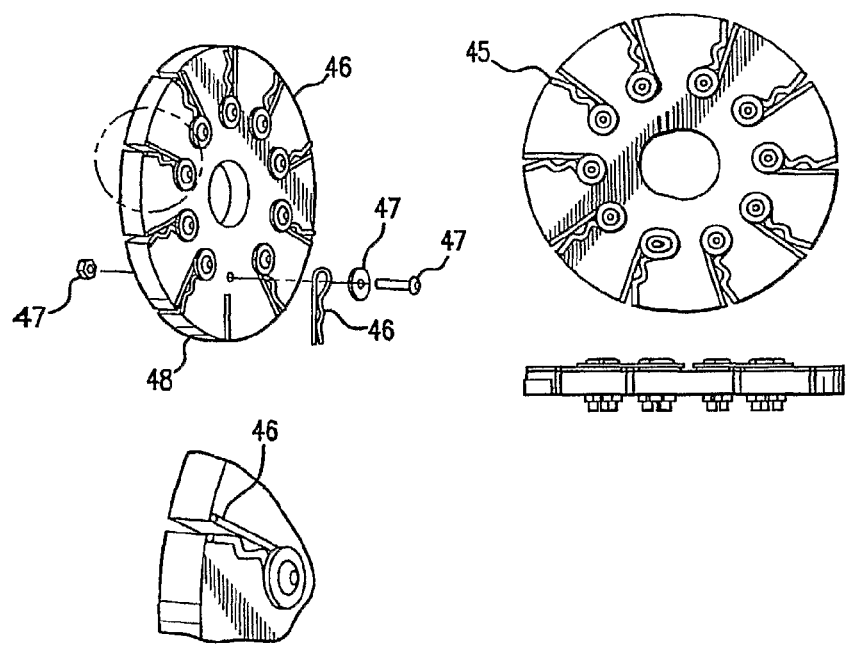
FIG. 8 illustrates the out disk assembly of the tape segmenting spindle.

Below the cable sorting threader 50, the pair of inner frame arms 30 also supports a revolvable tape segmenting spindle 40 and a tape rolls support rod 60. FIG. 6 shows the revolvable tape segmenting spindle 40 in more detail.

Figure 7:
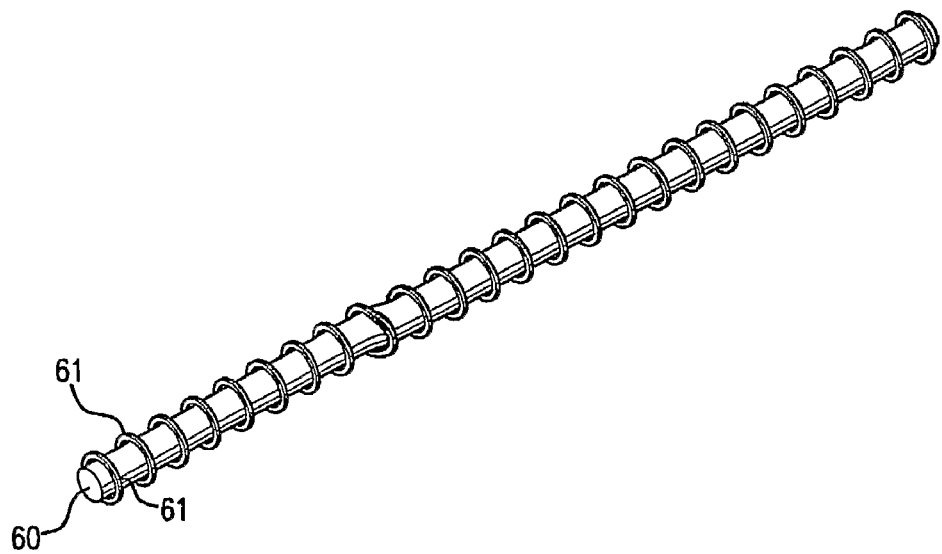
FIG. 7 illustrates a tape rolls support rod.

FIG. 7 shows the tape rolls support rod 60 in more detail. The tape rolls support rod 60 may include separating elements 61 which space apart adjacent tape rolls.

The outer frame 20 comprises a longitudinal first outside channel element 21 connected at a first end, by a base channel element 23, to a first end of a longitudinal second outside channel element 22.

A second end of the first outside channel element 21 is connected, by a hinge 26, to a first end of a longitudinal first inside channel element 24. A second end of the second outside channel element 22 is connected, by another hinge 26, to a first end of a longitudinal second inside channel element 25. The inside channel elements serve as outer frame re-locatable side panels that extend by relocation from an inner position to an extended outer position. Compare FIG. 1 to FIG. 9.

As indicated by arrows A and B in FIG. 1, the first and second inside channel elements extend by pivoting open to an extended position with the inside and outside channel elements being in-line (lengthwise) longitudinally aligned. The extended position increases the longitudinally length of the tool base which provides additional stability and mounting length to support cable axles with mounted cable reels.

The pair of outside channel elements 21, 22 are pivotedly connected to the pair of inside elements 24, 25 by the hinges 26, the pair of inside channel elements 24, 25 are thus pivotable to from i) a compacted (e.g., folded) position (FIG. 1) to an ii) extended position (FIG. 9). In the compacted position (FIG. 1) the length of each of the inside elements 24, 25 is parallel adjacent to the corresponding length of each of the outside channel elements 21, 22. The inside elements 24, 25 may be of any suitable length and need not extend the entire length of the outside elements 21, 22.

This compacted position may serve as a limited-space use configuration for using the took in cramped (limited) space conditions.

In the extended position (FIG. 9) the inside elements 24, 25 are lengthwise longitudinally aligned with the outside elements 21, 22.

The pair of pivots 31 is attached to the pair of the outside elements 21, 22, via spacers 35, as shown in FIG. 1.

As shown in FIGS. 1-3, the first and second outside channel elements 21, 22 and the base channel element 23 have open web portions of the respective channels facing outward. The tool 10 is, however, not so limited.

The outer frame 20 further comprises a removable staging bar 27. In FIG. 1, each end of the staging bar 27 is removably attached to one of the inner and outer channel elements, i.e., to one of elements 21 and 24 at a first end and, to one of elements 22 and 25 at a second end. The staging bar 27 is attached using conventional attachment parts 28, such as wing nuts secured to a threaded post or bolt.

Removal of the staging bar 27 facilitates relocating the inner channel elements 24, 25 from the compacted position into the extended position. Once in the extended position, the staging bar 27 can be reattached to the free ends of the extended inner channel elements 24, 25 as shown in FIG. 9. The staging bar 27 may also be comprised of a channel element. When the staging bar 27 is reattached at the ends of the extended inner channel elements 24 25, the upward facing channel serves as a support for resting plural cable reels 91. The thus-rested cable reels are self-aligned and ready to be mounted on a single cable axle 90 (rod).

As shown in FIGS. 1-3, the first and second inside channel elements 24, 25 have the open web portions of the respective channels facing inward, in the positions illustrated. However, when the inside channel elements 24, 25 are moved into the extended position, the open web portions of the channels face outward. See FIG. 9 illustrated inside channel element 24 in the extended position with the open web portion of the channel facing outward. The tool 10, however, is not so limited. Nor is the outer frame limited to use of channel elements. Suitable elements of a non-channel type may be substituted for channel elements.

The holes 29, on the upper face of the inside and outside channels serve as mounting points for axle saddles 34 that cradle the cable axles 90 in turn mounting plural cable reels 91. For clarity, FIG. 1 shows only a single saddle 34; however, a saddle 34 is provided for each end of each cable axle. The axle saddles 34 securely support the cable axles so that the cable axles and the cable reels remain in a fixed position during the subsequent cable pulls. The outer frame 20, in the extended position, has sufficient length to support plural cables axles which in turn can support a flexible number of cable reels and boxes. One embodiment supports 48 cable reels. Thus, in that embodiment, cable pulls can be accommodated where 48 cables can be pulled at one time.

Each of the pair of inner frame arms 30 is attached to the outer frame 20 via the intermediate spacer 35. This allows each of the inner frame arms 30 to locate adjacent one of the inside channel elements 24, 25 when the pair of inner frame arms 30 (as shown in FIG. 2) is positioned coextensive with the outer frame 20, i.e., in the ready for transport condition.

The pair of inner frame arms 30 pivot at pivots 31 and are each retained in the position shown in FIG. 1 by engagement of a retainer 32 at the position shown. Releasing retainers 32 allows the craftsman to locate the pair of inner frame arms 30 from the in use condition (FIG. 1) to the ready for transport condition (FIGS. 2-3) by pivoting in the direction of arrow C shown in FIG. 1. Thus, the retainers 32 engaging the pair of inner frame arms 30 to the outer frame 20 maintains the pair of inner frame arms 30 in a stationary position.

The retainers 32 engages alternative sets of aligned openings 33 in the pair of inner frame arms 30 and in the outer frame 20 to maintain the pair of inner frame arms 30 in a stationary position. In a first set of the aligned openings 33 the engaged retainers 32 maintain the pair of inner frame arms 30 orthogonal to the outer frame 20 (in the ready for use condition), and in a second set of the aligned openings 33 the engaged retainers 32 maintain the pair of inner frame arms 30 coextensive with the outer frame 20 (in the ready for transport condition) The retainers 32 are disengaged from the aligned openings to allow pivoting of the pair of inner frame arms 30 from one position to another position.

When the tool 10 is in the ready for transport condition, the retainers 32 engage in aligned openings 33 of the outer frame and the pair of inner frame arms 30 to secure the pair of inner frame arms 30 to the outer frame 20 as shown in FIG. 3.

The tool 10, in the ready for transport condition, provides a compacted unit with easy mobility around a job site utilizing the wheels 70. Also, large embodiments of the tool 10, when in the ready for transport condition, continue to be mobile and fit into small spaces such as trucks and elevators. As illustrated, the tool 10 is compact enough to be moved by a single craftsman.

Ideally, when information signal cable (e.g., cat 5, cat 6, copper, and fiber-optic) is pulled, the cable is perfectly flat without any twisting. However, this is not how cable acts when removed from a cable reel or from a cable box due to the cable retaining the coiled shape memorized from being reeled or boxed. Thus, in the prior art, as cable is pulled from a cable reel or from a cable box, the cable includes cable reel memory (also known as cable set) which has the effect of twisting or coiling the cable.

The present invention removes this cable reel memory. Advantageously much of the cable reel memory is removed, more advantageously; substantially all the cable reel memory is removed.

The cable sorting threader 50 comprises cable reel memory reducing holes 52 provided in the vertical section. Cables 92 are passed through each of the holes 52 of the cable sorting threader 50. See FIGS. 1 and 9. The cable sorting threader 50 is positioned relative to the cable reels/boxes and these holes 52 are sized to allow the craftsman to pull the cable through the holes and concurrently remove the cable reel memory present in the cable as the cable comes off the reel or out of the box. The craftsman pulling the cable through the cable sorting threader advantageously removes sufficient cable reel memory that the amount of cable required is reduced as compared to not pulling the cable through the cable sorting threader and the cables pulled lay flatter than they otherwise would. Thus, the holes 52 are sized to passed information signal cable and concurrently remove sufficient cable reel memory present in the cable as the cable comes off a reel or out of a box to increase an effective length of the cable passed through the holes by at least 10% as compared to the same cable pulled from the reel or out of the box but not passed through the holes 52.

In the prior art, pulling cable often resulted in knots and/or kinks within the pulled cable. These knots and kinks narrow and/or weaken the cable jacketing. This is a particular tricky problem as the pulled cable may initially test satisfactory, but may later fail. The later failing results in the cable being unsatisfactory for its intended use. When cable fails, the failed cable must be repaired or replaced.

Pulling the cable through the cable sorting threader eliminates cable with knots and kinks from being placed in service since the holes 52 are sized to block any knot or kink from passing through the holes 52.

Figure 4:
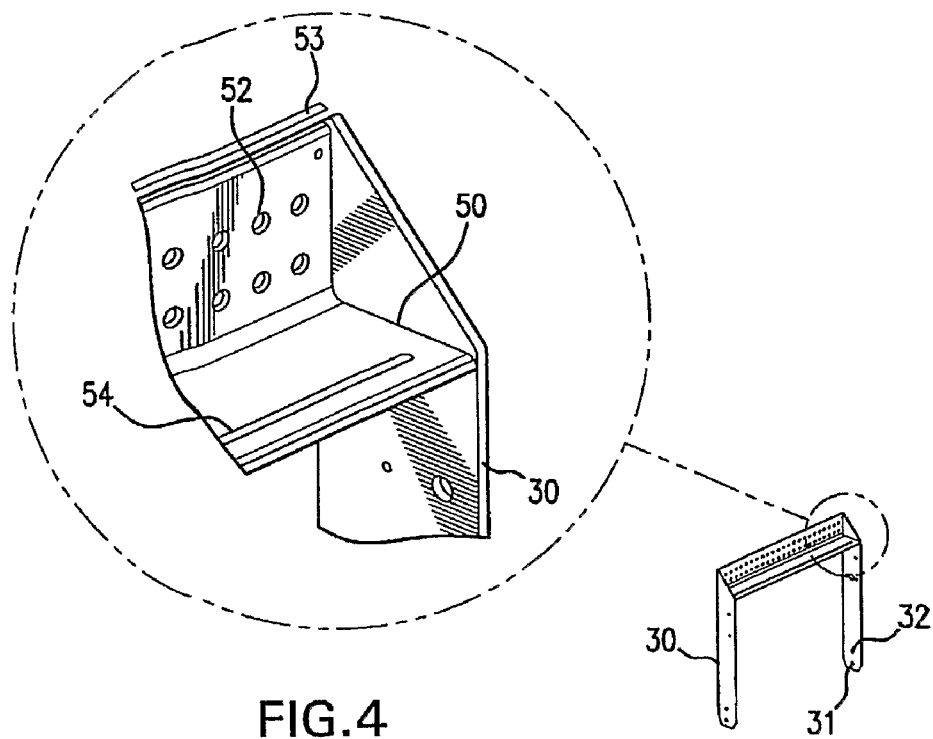
FIGS. 4-5 illustrate two views of the inner frame arms and cable sorting threader with enlarged details of the cable sorting threader connecting to the inner frame arms.
Figure 5:
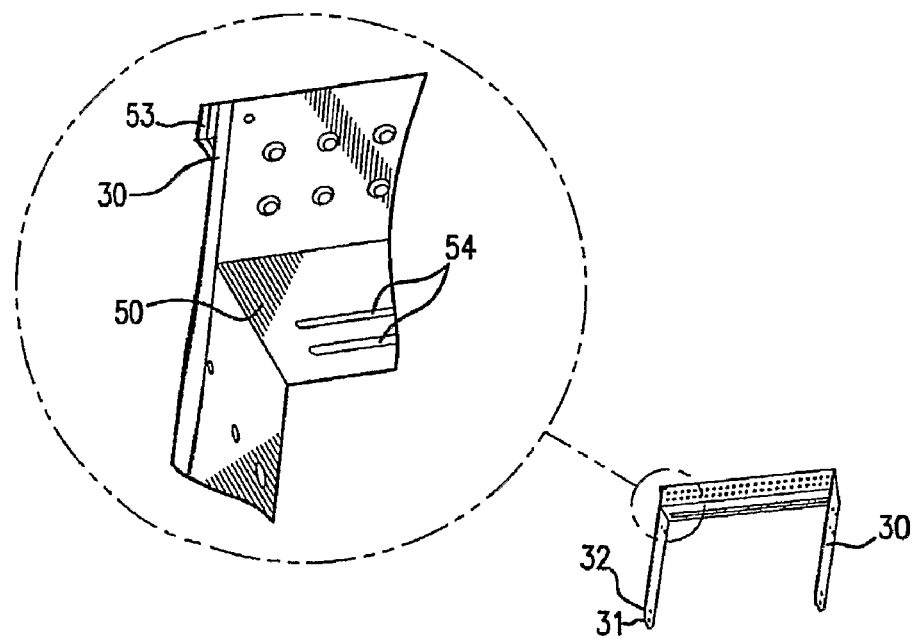

Cable meter 80 mounts on the horizontal section of the cable sorting threader 50 and travels along a longitudinal groove(s) 54 of the horizontal section. See FIGS. 4-5 illustrating the groove(s) and FIG. 1 illustrating the meter 80 mounted on the cable sorting threader 50. Plural meters may also be mounted on the horizontal section.

Tape rolls support rod 60 mounts plural tape rolls, in a side by side manner, across the width of the pair of inner frame arms 30. As shown in FIG. 7, the tape rolls support rod 60 may include separating elements 61 (e.g., o-rings) which space apart adjacent tape rolls.

Tape segmenting spindle 40 revolves by user operation of a detachable crank handle 41. The crank handle may act on the segmenting spindle through a ratchet 49 (or alternatively a clutch). Use of the ratchet assures that the spindle is moved forward in a specific direction upon turning the handle and assures that there is no backward movement.

The tape segmenting spindle 40 is comprised of parallel spaced apart fins 42. The fins 42 run in a longitudinal direction to form a cylindrical shape across the pair of inner frame arms 30. The fins 42 detach from spindle 40 and a detached fin 42 may rest on an uppermost edge of the cable sorting threader 50.

As shown in FIG. 6, the fins 42 are non-planar and may be L-shaped.

The tape segmenting spindle 40, in large embodiments, also comprises three center disk assemblies 43, 44, i.e., two outer disk assemblies 43 and a middle disk assembly 44. Smaller embodiments may have fewer than three total disk assemblies.

Each of the disk assemblies comprises radial slots 45. Some of the slots 45 include a fin retaining clip 46 fixed adjacent the slot 45 by, e.g., by hardware elements 47, to a substrate disk 48. In some embodiments only slots of the middle disk assembly have the clips.

Each fin 42 is insertable into the aligned slots 45 of the three center disk assemblies 43, 44. The clips 46 of the two outer disk assemblies 43 retain the fin 42 until the craftsman extracts the fin 42 from the slots 45, e.g., after the tape segments have been affixed to the fin 42 and cut to length.

The length of the cut tapes is therefore determined by the fin spacing, the fin spacing being in turn determined by slot spacing on the perimeter of the disks 48.

FIGS. 1-3 illustrate wheels 70 attached to the outer frame 20 in two alternative locations. Casters can substitute for the wheels 70. The wheel bracket 71 is secured to the base channel element 33 by hardware 72 that may include wing nuts. This allows the wheel bracket 71 to be user detachable from the base channel element 23.

One embodiment of the inventive structured cabling tool 10 includes the outer frame 20 (as shown in FIG. 9) extended in the ready for use condition and (as shown in FIG. 2) compacted (here folded) in the ready for transport condition.

As illustrated by FIG. 1, the inner frame arms 30 are pivotably supported within the outer frame 20. As discussed above, the inner frame arms 20 are fixable in a first position upright orthogonal to the extended outer frame (i.e., when in the ready for use condition as shown in FIG. 9 and as shown in FIG. 1) and a second position compacted coextensive with the folded outer frame (i.e., in the ready for transport condition as shown in FIG. 2).

As shown in FIG. 1, a cable sorting threader 50 is supported between the inner frame arms 30. A revolvable tape segmenting spindle 40 is also supported by the inner frame arms 30 and is located below the cable sorting threader 50.

The outer frame 20 has been illustrated above with the outside channel members being hinged to the inside channel members, but the invention is not so limited. The outer frame is reconfigurable from/to a compacted position to/from an extended position.

Figure 10:
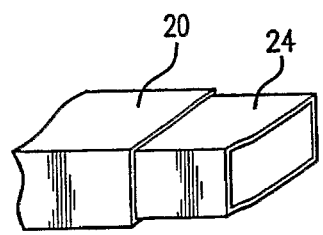
FIG. 10 illustrates an exemplary element-inside-element arrangement.

Alternative constructions of the outer frame which accomplish this reconfiguration are within the scope of the invention. For example, FIG. 10 illustrates an element-inside-element alternative. This construction is useful for both the outer frame and for the saddles 34.

In the case of the saddles 34, an element-inside-element construction allows the saddles to be raised from the outer frame and thus to position the cable axles 90 higher off the floor. This increases the usefulness of the tool in that larger size reels may be accommodated.

In the case of the outer frame 20, the outside channel members 21, 22 house the inside channel members 24, 25 in the compacted position (with the members being one inside another coextensive) whereas in the extended position, the inside members extend from the outside members (with the members being in-line longitudinally aligned).

Use of the Tool

The tool 10 is transported to the job location and placed with the outer frame 20 flat against the floor.

The staging bar 27 is removed and the outer frame changed from the folded position to the extended position, i.e., from that shown in FIG. 1 to that shown in FIG. 9.

The staging bar 27 is attached to the end of extended outer frame 20 (see FIG. 9). Plural cable reels are placed on staging bar 27 to accept a single cable axle. Each thus-configured cable axle, with mounted cable reels, is then repositioned to be supported by a pair of opposing axle saddles 34 attached on the outer frame 20. In one embodiment, sufficient cable axles are thus supported on the outer frame 20 that up to 48 cable reels can be supported for simultaneous pulling of the 48 cables. Cable can also be pulled directly from cable boxes placed proximity the outer frame 20 and routed through the cable sorting threader 50.

Cables to be pulled are individually inserted into individual ones of the holes 52 of the cable sorting threader 50 (See FIG. 9). At the start of each cable pull, the individual cables are grouped and banded together.

Rolls of color-coded tape are mounted on the tape rolls support rod 60 and the tape rolls support rod 60 attached to the inner frame arms 30. The tape rolls, supported on the tape rolls support rod 60, are thus positioned directly above the tape segmenting spindle 40 and below the holes 52. Tape pulled from each tape roll is pressed against a common one of the fins 42. The tape rolls support rod 60 holds sufficient tape rolls to allow for two pieces of tape to be cut in a single operation during most cable pulls.

The vertical alignment of the holes 52, the tape rolls, and the fins 42 provide that after cutting the tape and relocating the fin, to be secured within the fin retaining plate 53 by retaining element 54, the cut pieces of tape are aligned over the holes corresponding to the appropriate cables for those cut pieces of tape.

Turning crank handle 41 further deploys tape onto the fins 42 of the tape segmenting spindle 40. The direction and amount of rotational movement is set by the ratchet 49. Advantageously, the number of positions of rotation set by the ratchet equals the number of fins on the spindle 40.

When the spindle 40 has been operated to complete acceptance of appropriate lengths of tape as transferred tape segments on plural ones of the fins 42, the tape segments can be easily cut to uniform lengths by using an edge of each fin 42 as a cutting guide. Thereafter, a first fin 42 is detached from the retaining clips 46 and secured on the uppermost edge of the cable sorting threader 50 by fitting the fin between the fin retaining plate 53 and the vertical section of the threader. Operation of the retaining element 54 presses the plate 53 against the vertical section to secure the fin.

This positions the first fin 42 (with the two cut tape segments per hole) such that the craftsman using the tool 10 can quickly write an identification code on each of the tape segments without moving from the work area and without risk of misidentifying the cabling. The thus-marked tape segments serve as beginning-of-pull and end-of-pull tape segments and can be correctly transferred to the beginning and terminal ends of the individual cables being pulled. In this way, both the beginning and terminal ends of the cables are assured to be correctly identified.

At the end of a first cable pull, a next second fin 42 can be used to form tape segments for a second cable pull. After transferring the second fin 42 to the uppermost edge of the cable sorting threader 50, these new tape segments can be transferred to the second cables being pulled. In this way, the labels are consistent as to length and appearance from the first cable set being pulled to the second cable set pulled to further cable sets pulled. Also, as noted above, the vertical alignment of the holes 52, the tape rolls, and the fins 42 provide that after cutting the tape and relocating the fin, to be secured within the fin retaining plate 53 by retaining element 54, the cut pieces of tape (labels) are aligned over the holes corresponding to the appropriate cables for those labels. This promotes accuracy and avoids errors.

The cable meter 80 is mounted into place on cable sorting threader 50 to provide point of use, real time measurement of cable useage as cable is pulled from the tool 10. This point of use measurement assures cables are cut to the exact length needed and waste is avoided. Even when staggered lengths are quickly measured out and cut, the cable meter 80 provides accurate measurement. As noted above, plural cable meters may be mounted to the threader 50 when desired.

The above embodiments are provided as examples of the invention and are not extended to be exclusive applications of the invention. As noted, the invention has application to a variety of cable uses and is easily reconfigurable for different work and space conditions.

The invention claimed is:

1. A cabling sorting threader and labeling tool for sorting and labeling both the beginning and terminating ends of voice and data cabling being installed in horizontal runs of a building's structured cabling system, comprising:
    a cable labeling system; and
    a cable sorting threader vertically aligned with the cable labeling system,
    the structured cabling sorting threader comprised of a vertical section with horizontally spaced apart holes located on the vertical section, the holes sized to pass individual voice and data cables therethrough,
    the cable labeling system comprising a horizontal element configured and arranged to initially receive plural cable labels along a length of the element for simultaneously aligning two adjacent cable labels vertically over each of the holes for subsequent transfer of each cable label to opposite ends of a corresponding cable passing through each hole, wherein,
    the structured cabling sorting threader is located vertically over the cable labeling system, and
    the cable labeling system comprises at least one movable fin configured and arranged to i) initially receive plural cable labels along a length of the movable fin with the fin being located below the cabling sorting threader, and ii) relocate the movable fin vertically over the cable labeling system to relocate the placed plural cable labels for simultaneously aligning two adjacent cable labels vertically over each of the holes for subsequent transfer of each cable label to opposite ends of a corresponding cable passing through each hole.

2. The cabling tool (10) of claim 1, wherein,
    the cable labeling system has parts located vertically below the cabling sorting threader.

3. The cabling tool (10) of claim 1, wherein,
    the cable labeling system has at least one part located vertically above the cabling sorting threader.

4. The cabling tool (10) of claim 3, wherein,
    the cable labeling system has plural parts located vertically above the cabling sorting threader.

5. The cabling tool (10) of claim 4, further comprising:
    an auxiliary threader bar, spaced horizontally apart from the cabling sorting threader, with further horizontally spaced holes to pass the pulled cables through, wherein,
    the further holes of the threader bar are aligned with holes of the cabling sorting threader.

6. The cabling tool (10) of claim 4, configured to provide for:
    threading each of plural cables to the spaced apart holes within the structured cabling sorting threader with one cable passing through each hole;
    with the cable labeling system, segmenting tape to form a set of the two adjacent cable labels for each cable passing through the holes;
    placing the first label of each two adjacent cable labels on the beginning ends of the cables, one first label being placed on each cable; and after pulling the cables through the holes, placing the second labels on the terminal ends of the cables, one second label being placed on each cable, wherein, the set of cable labels are formed and placed by i) placing tape from each of plural tape rolls onto the fin,
ii) cutting the tape covering the fin to segment the tape and form, at the same time, both of the adjacent first and second labels,
iii) detaching the fin from a remaining part of the cable labeling system, and
iv) relocating the fin onto the threader to relocate the placed plural cable labels for simultaneously aligning two adjacent cable labels vertically over each of the holes for subsequent transfer of each cable label to an end of a corresponding cable passing through each hole.

7. The cabling tool (10) of claim 1, further comprising:

a pair of vertical frame arms therebetween supporting the structured cabling sorting threader and therebetween supporting the cable labeling system; and a lower frame providing a base supporting the vertical frame arms, wherein, simultaneously aligning the two adjacent cable labels vertically over each of the holes for subsequent transfer of each cable label to an end of corresponding cable passing through each hole allows correct transfer of a first label of the two cable labels to a beginning end of the corresponding cable located vertically below the first label and transfer of a second label of the two cable labels to a terminal end of the corresponding cable located vertically below the second label, the thus-applied first and second labels serving as beginning-of-pull and end-of-pull labels to correctly identify the beginning and terminal ends of the individual cables being pulled.

8. The cabling tool (10) of claim 7, wherein, the cable labeling system includes i) a removable tape rolls support rod supported by and between the pair of frame arms and located below the cabling sorting threader, and ii) a revolvable tape segmenting spindle (40) supported by the pair of frame arms and located adjacent the tape rolls support rod, the tape rolls support rod configured for adjacently mounting plural tape rolls, tape on the tape rolls providing the cable labels to the fin mounted on the spindle.

9. The cabling tool (10) of claim 8, wherein, there are plural of the movable fin, the tape segmenting spindle supports the plural fins as parallel spaced apart fins (42), the fins running in a longitudinal direction to form a cylindrical shape across the pair of frame arms, each fin located to withdraw tape from the tape rolls during rotation of the spindle and to receive the withdrawn tape during the rotation of the spindle, and the fins detach from the tape segmenting spindle to move to the structured cabling sorting threader to transport the received tape, the received tape forming the cable labels.

10. The cabling tool (10) of claim 7, wherein, the pair of vertical frame arms pivot with respect to the lower frame providing the base supporting the vertical frame arms.

11. The cabling tool (10) of claim 1, wherein, the holes of the structured cabling sorting threader are sized to pass individual copper voice and data cables therethrough.

12. The cabling tool (10) of claim 1, wherein, the holes of the structured cabling sorting threader are sized to pass individual fiber-optic voice and data cables therethrough.

13. The cabling tool (10) of claim 1, wherein, the holes of the structured cabling sorting threader are sized to pass individual security structured cables therethrough.

14. A cabling sorting threader and labeling tool for sorting and labeling both the beginning and terminating ends of voice and data cabling being installed in horizontal runs of a building's structured cabling system, comprising:

a cable labeling system; and a cable sorting threader vertically aligned with the cable labeling system, the structured cabling sorting threader comprised of a vertical section with horizontally spaced apart holes located on the vertical section, the holes sized to pass individual voice and data cables therethrough, the cable labeling system configured and arranged to initially receive plural cable labels along a horizontal length for simultaneously aligning two adjacent cable labels vertically over each of the holes for subsequent transfer of each cable label to opposite ends of a corresponding cable passing through each hole, wherein, the cable labeling system includes:

i) a fin retaining element located adjacent the cabling sorting threader;
ii) a removable tape rolls support rod (60) supported by a pair of frame arms and located below the cabling sorting threader, the tape rolls support rod for adjacently mounting plural tape rolls, tape on the tape rolls providing the cable labels; and
iii) a revolvable tape segmenting spindle (40) supported by the pair of frame arms and located below the tape rolls support rod, the tape segmenting spindle supporting plural of the fins as parallel spaced apart fins (42), the fins running in a longitudinal direction to form a cylindrical shape across the pair of frame arms, the fins detaching from the tape segmenting spindle and insertable between the fin retaining plate and the cabling sorting threader.

15. The cabling tool (10) of claim 14, adapted for executing the steps of:

threading the cable to the spaced apart holes within the structured cabling sorting threader with one cable passing through each hole;

with the cable labeling system, segmenting tape to form a set of the two adjacent cable labels for each cable passing through the holes;

placing the first label of each two adjacent cable labels on the beginning ends of the cables, one first label being placed on each cable;

pulling the cables through a building to a destination location; and after pulling the cables to the destination location, placing the second labels on the terminal ends of the cables, one second label being placed on each cable, wherein, the set of cable labels are formed and placed by the steps of i) placing tape from each of the tape rolls located on the tape rolls support rod (60) onto one of the fins,
ii) rotating the tape segmenting spindle so that the rotation of the tape segmenting spindle withdraws tape from the tape rolls and covers the fin with the tape withdrawn from the tape rolls,
iii) cutting the tape covering the fin to segment the tape and form, at the same time, both of the adjacent first and second labels,
iv) detaching the fin from the tape segmenting spindle and mounting the fin with the fin retaining element, and v) taking labels from the fin and placing one first label on a corresponding one of the pulled cables at a hole located in vertical alignment with a location of the label on the fin, wherein, in said step of iii) cutting the tape covering the fin to segment the tape and form the labels of both of the first and second label sets, each label of the first label set is located immediately adjacent a label of the second label set.

16. A cabling sorting threader and labeling tool for sorting and labeling both the beginning and terminating ends of voice and data cabling being installed in horizontal runs of a building's structured cabling system, comprising:
 a cable labeling system; and
 a cable sorting threader,
 the structured cabling sorting threader comprised of a vertical section with horizontally spaced apart holes located on the vertical section, the holes sized to pass individual voice and data cables therethrough,
 the cable labeling system comprising i) a tape rolls support rod, the tape rolls support rod for adjacently mounting plural tape rolls, and ii) a revolvable cylindrical shape mechanism including plural detachable tape-receiving elements,
 the detachable tape-receiving elements revolvable and positioned to receive tape from the tape rolls,
 each detachable tape-receiving element providing a cutting guide for cutting the received tape into labels of uniform lengths, wherein sets of two cable labels for each cable are thereby provided, and
 each detachable tape-receiving element configured and arranged to be relocated over the cable sorting threader to relocate the sets of two cable labels vertically aligned over each of the holes for subsequent transfer of each cable label to opposite ends of a corresponding cable passing through each hole.

17. The cabling tool of claim 16, wherein,
 the revolvable cylindrical shape mechanism defines a revolvable tape segmenting spindle located adjacent the tape rolls support rod, and
 each detachable tape-receiving element is a fin providing a surface for marking of the cable labels by a craftsmen.

18. The cabling tool of claim 17, wherein,
 the revolvable cylindrical shape mechanism further comprises a handle removably engaging the tape segmenting spindle, user operation of the handle moving the tape segmenting spindle to revolve, and
 the fins are arranged as parallel spaced apart fins.

19. The cabling tool of claim 18, wherein,
 the fins are L-shaped, and
 the tape segmenting spindle further comprises plural disk assemblies,
 the disk assemblies each comprise a substrate disk with radial slots, the slots including a fin retaining clip,
 each fin is insertable into aligned slots of the disk assemblies with the clips retaining the inserted fin, and
 the cable sorting threader comprises a retaining element located adjacent the cabling sorting threader, the retaining element for retaining the relocated tape-receiving element over the cable sorting threader with the two adjacent cable labels aligned vertically over each of the holes for subsequent transfer of each cable label to opposite ends of the corresponding cable passing through each hole.

\* \* \* \* \*